Jan. 13, 1970 D. W. HOLDSWORTH 3,489,006
HEAT METER
Filed Dec. 6, 1965
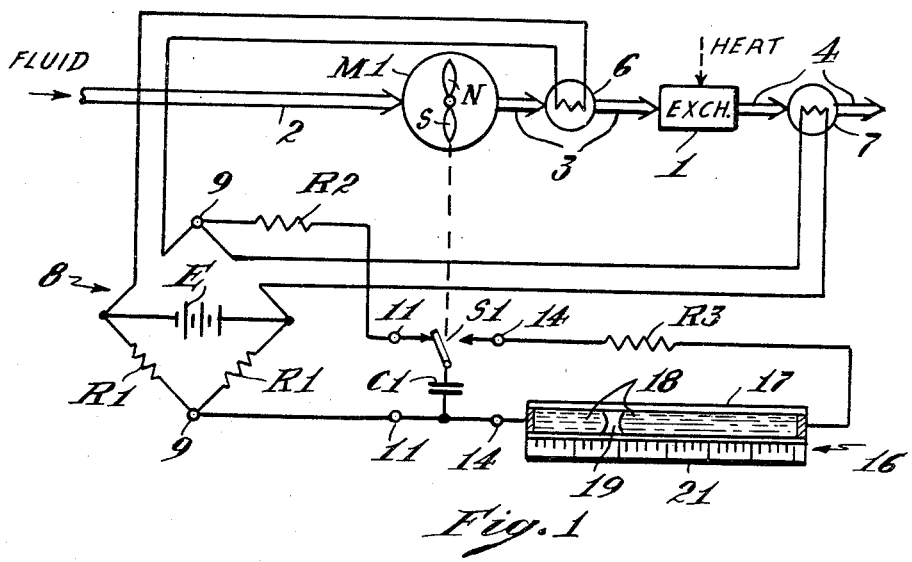
Fig. 1
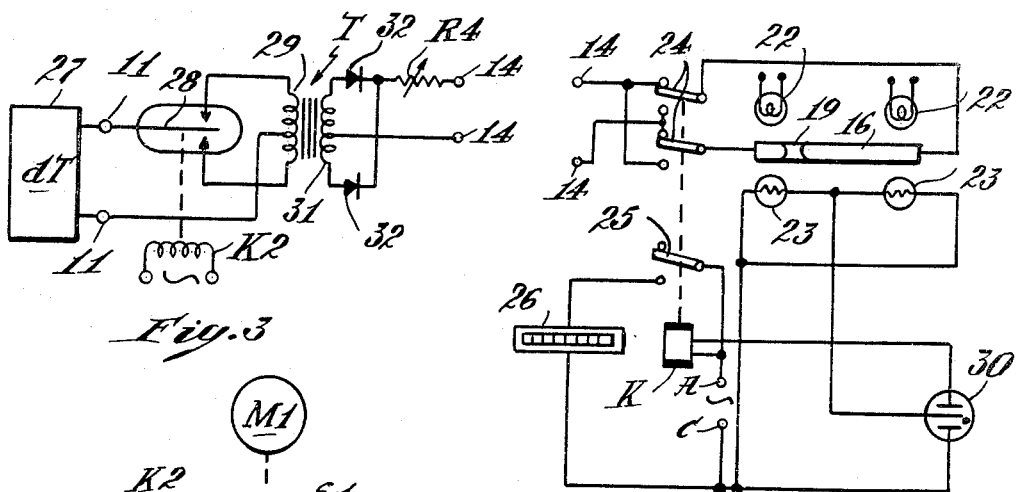
Fig. 3
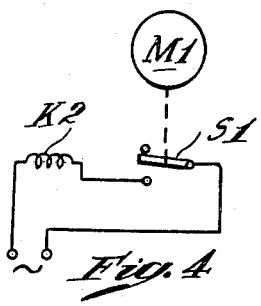
Fig. 4
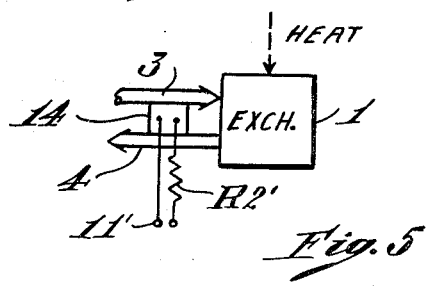
Fig. 5
Fig. 2
INVENTOR.
Dennis W. Holdsworth
BY
Roberts, Cushman & Grover
ATT'YS

United States Patent Office 3,489,006
Patented Jan. 13, 1970

3,489,006
HEAT METER
Dennis W. Holdsworth, Lincoln, Mass., assignor to Comstock & Wescott, Inc., Cambridge, Mass., a corporation of Massachusetts
Filed Dec. 6, 1965, Ser. No. 511,941
Int. Cl. G01k 17/06
U.S. Cl. 73—193      7 Claims

ABSTRACT OF THE DISCLOSURE

Spaced thermocouples in a Wheatstone bridge measure the temperature change of a fluid flowing on a heat exchange path while a fluid flow meter transfers an electrical switch between two positions. The unbalance current from the bridge is periodically connected by the switch to a capacitor which charges proportionally to the temperature change and is discharged by the switch at a rate dependent on the rate of flow. The capacitor discharges through a time integrating coulometer including an electrolyte wall movable along a mercury column. A photoelectric relay sensing the electrolyte at the end of the column reverses the polarity of discharge through the column and actuates a digital counter. Where the fluid flow is constant a reed switch vibrated at 60 cycle A.C. frequency is substituted for the flow meter and the unbalance current supplied to the coulometer through a step-up transformer.

---

Various kinds of heat metering apparatus have been described which involve measurement of the rate of fluid flow and of the temperature change during heat exchange together with an integration of the two measurements to yield the total heat exchanged over a period of time. Such apparatus is shown in U.S. Patent Nos. 1,386,937 and 2,210,082. While known heat meters are suitable for large installations where their cost is negligible compared with that of the installation, there is a need for an inexpensive but reliable apparatus for measuring heat exchange with each of many small equipments, for instance an air conditioning unit.

Accordingly the invention has for its objects to provide a simple economical and reliable apparatus for recording the total amount of heat transferred to or from a fluid flowing on a path.

According to the invention apparatus for measuring heat exchange with a fluid flowing on a path comprises sensing means responsive to the temperature difference of the fluid at two parts of said path to produce an electrical current dependent on said difference, means for measuring the time integrated value of said current, and a channel connected between said sensing means and measuring means, wherein said channel includes switching means for dividing said current into increments and for adjusting the current increments applied to said measuring means dependent on the rate of flow of said fluid.

Further according to the invention the apparatus comprises sensing means responsive to the temperature difference of the fluid at two parts of said path to produce an electrical current dependent on said difference, means for measuring the time integrated value of said current including indicator means reversibly moving between two positions in response to current flow, and a channel interconnecting said sensing means and measuring means including switching means responsive to movement of said indicator means to one of said positions to reverse the polarity of current flow through said measuring means.

For the purpose of illustration typical embodiments of the invention are shown in the accompanying drawing, in which:

FIG. 1 is a schematic diagram of a heat meter; and
FIGS. 2 to 5 are modifications of the meter of FIG. 1.

The heat meter shown in FIG. 1 measures the heat absorbed in a heat exchanger 1 by a fluid flowing on a path 2, 3, 4 through the exchanger 1. Typically the exchanger cools the working medium of a refrigeration system, and in turn is heated by the working medium. Thus the fluid at part 3 of the path in advance of the exchanger will be cooler than at part 4 after heating in the exchanger. Thermally responsive resistive elements 6 and 7, which reflect the temperature difference between parts 3 and 4 of the fluid path, are connected in opposite legs of a Wheatstone bridge 8. The bridge also includes equal resistances R1 in the two other opposite legs, and a battery E across the bridge. The output terminals 9 of the bridge deliver a current proportional to the difference of fluid temperature at path parts 3 and 4, dependent on the linearity of the elements 6 and 7. This temperaure difference dependent current is delivered to terminals 11 through a resistor R2 which, with a capacitor C1, forms a current storage network.

As shown in FIG. 5, an equivalent current may be delivered to terminals 11' through a like resistance R2' by a thermoelectric element 14 physically sensing the temperature at both parts 3 and 4 of the fluid path.

Reverting to FIG. 1, the current storage network R2, C1 is charged and discharged by a proximity switch S1 magnetically actuated by the polarized blades N and S of a rotor type water flow meter M1 connected in a fluid path 2, 3. As the magnetically polarized blades N and S rotate at a rate proportional to fluid flow they transfer the proximity switch S1 between left and right positions at a frequency dependent on the rate of fluid flow. In the left position the switch S1 permits the capacitor C1 to charge through the resistor R2 at a time constant rate faster than the most rapid rate of switch S1 transfer due to high fluid flow rate, the charge stored being proportional to temperature difference. In the right-hand position the switch S1 permits the capacitor C1 to discharge through terminals 14 to a time integrating coulometer 16 in series with a limiting resistance R3.

The coulometer 16 comprises a transparent capillary tube 17 containing a column of mercury 18 divided by a wall of electrolyte 19 such as a mercuric iodide solution. As current flows through the coulometer mercury is electrolytically transferred from one part of the column to the other, and the electrolyte wall progresses along the capillary. Its position, and hence the amount of heat dependent current passed, is indicated on a scale 21.

In some installations the rate of heat transfer to the fluid is slow and the progress of the electrolytic wall 19 from one end of the capillary tube 17 to the other extends well beyond the interval between meter readings. For installations where heat transfer is more rapid the capillary is of insufficient length without the modification shown in FIG. 2.

In FIG. 2 is shown a reversing switching circuit for high heat transfer installations, this circuit being connected to terminals 14 of FIG. 1 in place of the resistor R3 and coulometer 16. The circuit includes the coulometer 16 with exciter lamps 22 and photocells 23 respectively at the ends of the coulometer between which the electrolyte wall 19 progresses. Each of the photocells is connected to the grid of a glow discharge trigger tube 30 connected in series with an A.C. line and a latching relay K1 having three contactors 24 and 25. Two contactors 24 reverse the current path through the coulometer. The third contactor 25 connects a digital counter 26 to the A.C. line on alternate actuations of the relay K. Thus when the electrolyte wall moves to an end position between either exciter lamp and photocell, the photocell triggers the glow discharge tube 30 causing the latching relay K to reverse position. Current from terminals 14 is then applied to the coulometer in reverse polarity causing the electrolyte wall to progress in the opposite direction toward the other lamp and photocell pair. Also the counter is caused to register one excursion of the electrolyte wall.

In some installations the rate of fluid flow is substantially constant for long periods. For such installations a simplified circuit is shown in FIG. 3. Therein the block 27 represents temperature difference sensing means, such as the elements 6 and 7 and the bridge 8 of FIG. 1 or the thermoelectric element 14 of FIG. 5, supplying a current to terminals 11. This current is chopped by a reed switch 28 vibrated by a coil K2 at a frequency such as the 60 cycle frequency of the line A.C. to which it is connected. The resulting square wave signal is applied to the primary 29 of a step-up transformer T. The voltage amplified current in the secondary 31 is applied through rectifiers 32 to a variable resistance R4. This resistance is calibrated in units of fluid flow and is manually adjusted when the substantially constant flow is changed from one level to another. The rectified and flow adjusted current is applied to the coulometer terminals 14 of FIG. 1 or 2.

Shown in FIG. 4 is a modification of a part of the circuit of FIG. 3. The resistance R4 of FIG. 3 is omitted and the vibrating coil K2 is controlled by the proximity switch S1 operated by the flow meter M1 of FIG. 1. The switch S1 will be closed at a rate proportional to fluid flow, and will connect the vibrating coil K2 at that rate to its line terminals A.C. Consequently the reed switch 28 will pass current only when the coil K2 is energized, and the chopped current will be dependent on the rate of flow.

It should be understood that the present disclosure is for the purpose of illustration only, and that this invention includes all modifications and equivalents within the scope of the appended claims.

I claim:
1. Apparatus for measuring the heat exchange with a fluid flowing on a path, comprising:
   sensing means responsive to the temperature difference of the fluid at two parts of said path to produce an electrical current dependent on said difference,
   means for measuring the time integrated value of said current including indicator means reversibly moving between two positions in response to said electrical current flow, and
   switching means connected between said sensing means and measuring means for dividing said current into increments and applying said current through said measuring means, and means for adjusting the current increments applied to said measuring means according to the rate of flow of said fluid,
   second switching means responsive to movement of said indicator means to one of said position to reverse the polarity of current flow through said measuring means, and
   said second switching means including a counter for registering each response of said switching means.

2. Apparatus according to claim 1 wherein said measuring means comprises a column of mercury interrupted by a wall of electrolytic fluid movable along the mercury column in response to current therethrough, and said second switching means comprises means at one position adjacent the mercury column for detecting electrolyte at said position, and relay means responsive to said detecting means for reversing the polarity of current flow through said measuring means.

3. Apparatus according to claim 2 wherein said relay means comprises a contactor connected to an electrical supply and transferrable to a contact, and an electrically operated counter connected to said contact.

4. Apparatus according to claim 3 wherein a second detecting means is located at a position along said mercury column spaced from the aforesaid one position, said relay means being similarly responsive to said first and second detecting means.

5. Apparatus according to claim 2 wherein a second detecting means is located at a position along said mercury column spaced from the aforesaid one position, said relay means being similarly responsive to said first and second detecting means.

6. Apparatus for measuring heat exchange with a fluid flowing on a path, comprising:
   sensing means responsive to the temperature difference of the fluid at two parts of said path to produce an electrical current dependent on said difference,
   means for measuring the time integrated value of said current, and
   switching means connected between said sensing means and measuring means for dividing said current into increments and applying said current through said measuring means, and means for adjusting the current increments applied to said measuring means according to the rate of flow of said fluid,
   wherein said switching means comprises means responsive to flow of said fluid to produce a magnetic field varying at a rate dependent on the rate of flow of said fluid, and switch means connected between said sensing means and measuring means and actuated by said magnetic field to transmit current from said sensing means and measuring means in increments occurring at a rate dependent on the rate of variation of said field and said flow rate.

7. Apparatus for measuring heat exchange with a fluid flowing on a path, comprising:
   sensing means responsive to the temperature difference of the fluid at two parts of said path to produce an electrical current dependent on said difference,
   means for measuring the time integrated value of said current, and
   switching means connected between said sensing means and measuring means for dividing said current into increments and applying said current through said measuring means, and means for adjusting the current increments applied to said measuring means according to the rate of flow of said fluid,
   wherein said switching means comprises a first switch connected to said sensing means and having two contacts, a second switch and a coil adapted to be connected in series to alternating current terminals, said first switch being actuated by said coil, means responsive to flow of said fluid to produce a magnetic field varying at a rate dependent on the rate of flow of said fluid, said second switch being responsive to said varying field to connect said coil to said terminals, so that the coil is energized at intervals dependent on the rate of flow of said fluid and causes said first switch to transfer between said two contacts and chop said current during said intervals, and a transformer having a primary connected to said two contacts and a secondary connected to said measuring means for stepping up the voltage of the chopped current to the measuring means.

References Cited
UNITED STATES PATENTS

| | | | |
|---|---|---|---|
| 304,082 | 8/1884 | Edison | 324—94 |
| 1,005,671 | 10/1911 | Thorpe | 324—94 |
| 2,359,767 | 10/1944 | Keinath | 73—432 |
| 2,633,748 | 4/1953 | Lindstrom | 73—193 |
| 2,633,749 | 4/1953 | Lindstrom | 73—193 |
| 3,301,049 | 1/1967 | Meyerson | 73—193 |
| 3,343,083 | 9/1967 | Beusman | 324—94 |

RICHARD C. QUEISSER, Primary Examiner

HERBERT GOLDSTEIN, Assistant Examiner